J. W. FAESSLER.
ROLLER TUBE EXPANDER.
APPLICATION FILED JULY 25, 1918.
1,323,035.
Patented Nov. 25, 1919.
2 SHEETS—SHEET 2.
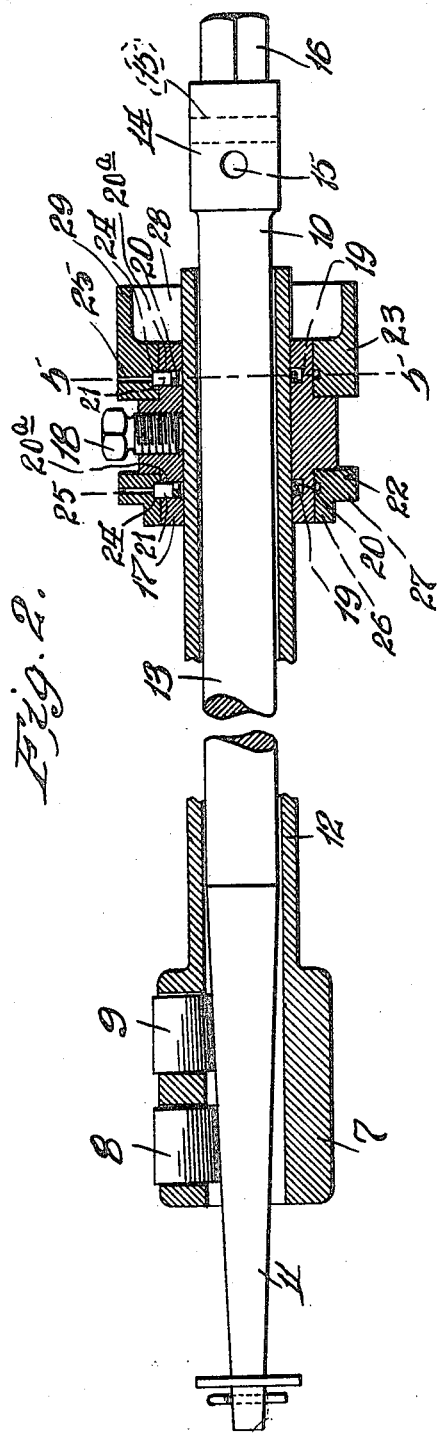
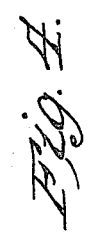
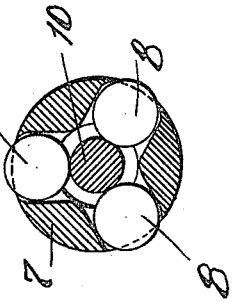
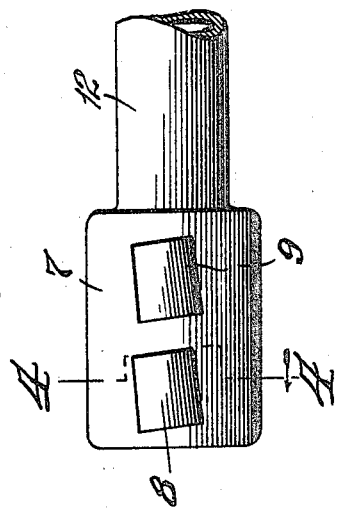
Inventor:
John W. Faessler.
By Edward E. Longan
Atty.

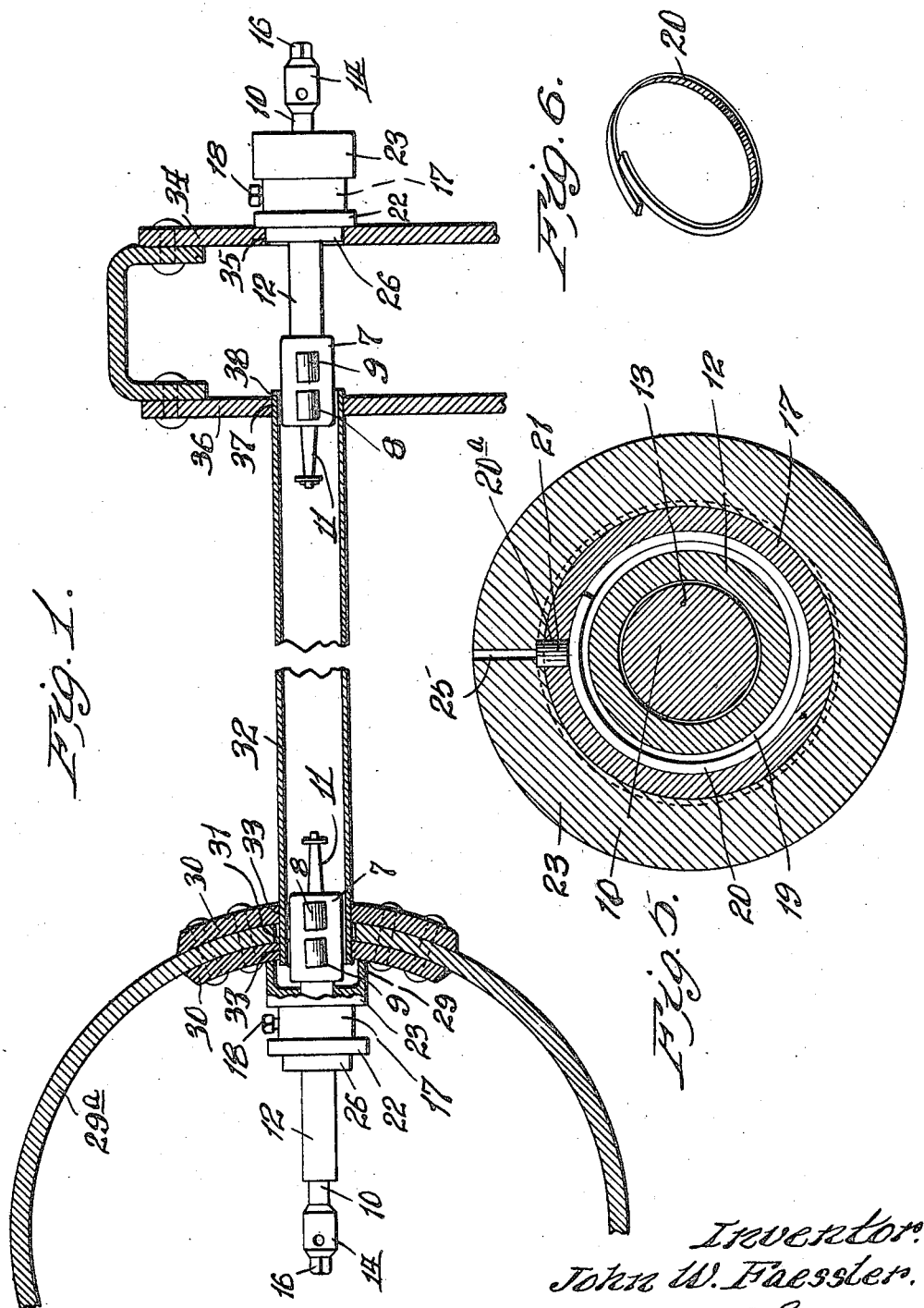

UNITED STATES PATENT OFFICE.

JOHN W. FAESSLER, OF MOBERLY, MISSOURI, ASSIGNOR TO J. FAESSLER MANUFACTURING COMPANY, OF RANDOLPH COUNTY, MISSOURI, A CORPORATION OF MISSOURI.

ROLLER TUBE-EXPANDER.

1,323,035.   Specification of Letters Patent.   Patented Nov. 25, 1919.

Application filed July 25, 1918. Serial No. 246,691.

*To all whom it may concern:*

Be it known that I, JOHN W. FAESSLER, a citizen of the United States, and resident of Moberly, in the county of Randolph and State of Missouri, having invented certain new and useful Improvements in Roller-Tube Expanders, of which the following is a specification, containing full, clear, and exact description, references being had to the accompanying drawings, forming a part thereof.

My invention relates to flue expanders and has for its principal object an expander whereby a flue can be expanded at two points simultaneously. A further object is to construct a flue expander designed especially for making emergency repairs in marine boilers, where it is necessary to expand the flue at two points in one portion and only at one point in another.

In the drawings,

Figure 1 is a sectional view of a drum, waterleg and flue, showing my device in operative position.

Fig. 2 is a longitudinal sectional view of my device.

Fig. 3 is a top view of the cage.

Fig. 4 is a cross section taken on the line 4—4 of Fig. 3.

Fig. 5 is an enlarged cross section on the line 5—5 of Fig. 2, of one of the collars, showing the locking plug in place.

Fig. 6 is a perspective view of the circular spring which actuates the locking plug.

In carrying out my invention I provide a cage 7, in which is located sets of tapered rollers 8 and 9 spaced apart longitudinally of the cage and radially spaced in the cage. These rollers are set at an angle to the longitudinal axis of the cage 7, as indicated in Fig. 3. The object I accomplish by setting the rollers in this position is that when the mandrel 10 is turned in one direction, the tapered portion 11 is fed forward, causing the rollers to be driven outwardly from the periphery of the cage 7, and expanding the flue or tube at two different points simultaneously.

The cage 7 is provided with a shank 12, through which the mandrel passes. A portion of the mandrel 10 is made straight as indicated by the numeral 13, and on the end of the mandrel is located a cylindrical projection or portion 14, which is provided with openings 15 so that a bar can be inserted for turning the mandrel. On the outer end of the portion 14 I form a square portion 16, so that a wrench may also be used for turning the mandrel.

On the cage shank 12 is mounted a sleeve 17 which is provided with a set screw 18 so that the sleeve 17 may be securely locked in any desired position on the shank 12. This sleeve 17 is provided on its inner surface with a pair of grooves 19, in which circular springs 20 are located. Extending to the outer periphery of the sleeve 17 is a bore 20ª in which is seated a plug 21. Over each end of the sleeve 17 I place collars 22 and 23; the collar 22 acting as a guide or steady rest when my device is inserted through a handhole, and the collar 23, acting as a steady rest when using my device on the inside of a boiler shell or drum.

Each of these collars are provided with a recess or groove 24, in which the plug 21 seats, thereby locking the collars firmly on the sleeve 17. This locking only prevents longitudinal movement, but permits rotary movement of the collars. In order to remove the collars from the sleeve 17, I provide openings 25, through which a nail or similar device may be inserted and depress the plug 21 so that the collar may be slipped off from the sleeve 17.

The collar 22 is provided on its one face with a portion 26; this portion 26 being of less diameter than the collar 22 and leaving a shoulder 27, which will bear against the outer surface of the shell of the waterleg, as clearly shown in Fig. 1. The collar 23 is provided with a recess 28, leaving a rim or ring 29. This rim or ring is designed to fit over the edges of the boiler tube or flue so that there will be no direct pressure of the device upon the end of the flue.

In Fig. 1, 29ª represents a drum or boiler shell having the butt-straps 30. The opening 31 in the drum 29ª is of slightly larger diameter than the tube 32, whereas the openings 33 in the butt-straps 30 are of the same approximate diameter as that of the tube 32, and all the expansion of the tube is exerted on these butt-straps and not on the shell of the drum 29ª.

The waterleg 34 is provided with a handhole 35, which is closed in a manner well known to the trade. The wall 36 is provided with a bore 37 into which the end 38 of the boiler tube or flue 32 is inserted, and the tube expanded in this opening.

The operation of my device is as follows: When a boiler tube or flue becomes broken in any manner, the old tube or flue is removed, and a new one inserted through the opening 35. After the tube has been placed in position, the mechanic enters the boiler or drum 29 through a manhole provided for that purpose. The collar 23 is then adjusted so that the rollers 8 and 9 will bear against the tube at the points where they contact with the butt-straps 30. The mandrel 10 is now revolved in a direction which will cause the rollers 8 and 9 to feed it forward and cause the rollers to ride up on the tapered portion, expanding that part of the tube, which they contact with. When sufficient amount of expansion has taken place, the mandrel is turned in the opposite direction, releasing the rollers from the tubes.

During this operation the edge 29 of the collar 23 fits tightly against the surface of the inner butt-strap 30, and does not revolve, although the cage 7, the cage shank 12 and the sleeve 17 do turn. The object of having this collar turn freely on the sleeve 17 is to prevent scoring the inside of the drum. When it is desired to expand the tube in the waterleg, I make use of only one set of rollers. This may be accomplished by either using the first set, that is, the set nearest the front edge of the cage, or by removing one set of rollers from the cage entirely. When using my device in this position, I use the collar 22, the portion 26 of which fits into the handhole 35 forming a guide for the mandrel, and also preventing the scoring of the waterleg, and at the same time providing a sliding surface such as is provided for in the collar 23.

It will be obvious from the foregoing description that when I employ my invention for expanding the tubes in the drum where butt-straps are employed, the tube is expanded at two separate points simultaneously, arising from the fact that the sets of rollers 8 and 9 are spaced apart longitudinally, thus saving one-half the time used in expanding the flue with the old single roller type of expander, and when it is desired to expand the tube in the waterleg, the same instrument may be employed, as the same is provided with revoluble collars and a reversible sleeve on the cage shank.

Having fully described my invention, what I claim is:

1. A flue expander comprising a cage, a hollow shank formed integral therewith, a tapered mandrel located in the shank and cage, two sets of expanding rollers mounted in the cage and each set spaced apart a substantial distance longitudinally of the cage, a portion of the cage wall maintaining said sets separated, the rollers of each set being arranged at an angle to the longitudinal axis of the cage, said rollers adapted to expand tubes in the drum where butt-straps are employed at two separate points simultaneously, an adjustable reversible sleeve mounted on said shank, a collar adapted to be inserted in the hand hole of a water-leg, revolubly secured to said sleeve, and a collar adapted to be inserted over the end of a water tube and against the butt-strap revolubly secured to said sleeve.

2. A flue expander comprising a cage, a hollow shank formed integral with said cage, a tapered mandrel located in the shank and cage, two sets of expanding rollers mounted in the cage, each set separated a substantial distance longitudinally of the cage from the other set, and held in such spaced relation by a portion of the cage wall, the rollers of each set radially spaced apart, an adjustable reversible sleeve mounted on the shank, a collar provided with a shoulder adapted to be inserted in the hand hole of a waterleg revolubly and detachably secured to the said sleeve, a collar adapted to span the end of a tube and rest against the butt-strap of the drum revolubly and detachably secured to said sleeve, and a set screw for rigidly securing said sleeve in the desired adjustment on the hollow shank.

3. A flue expander comprising a cage, a hollow shank formed integral with said cage, a tapered mandrel located in the shank and cage, two sets of expanding rollers mounted in the cage, each set separated a substantial distance longitudinally of the cage from the other set, and held in such spaced relation by a portion of the cage wall, the rollers of each set radially spaced apart, an adjustable and reversible sleeve mounted on the shank, a collar provided with a shoulder adapted to be inserted in the hand hole of a waterleg, a split ring and a stud for securing said collar to said sleeve, a collar adapted to span the end of a tube and rest against the butt-strap of a drum, a split ring and stud for securing the last mentioned collar to said sleeve, and a set screw for rigidly securing said sleeve in the desired adjustment on the hollow shank.

In testimony whereof I have signed my name to this specification in the presence of two subscribing witnesses.

JOHN W. FAESSLER.

Witnesses:
L. M. PERRINE,
EMIL F. GUTEKUNST.